United States Patent
Thumati

(10) Patent No.: US 10,922,412 B2
(45) Date of Patent: Feb. 16, 2021

(54) AUTOMATIC TAMPERING DETECTION IN NETWORKED CONTROL SYSTEMS

(71) Applicant: The Boeing Company, Chicago, IL (US)

(72) Inventor: Balaje T. Thumati, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 15/876,638

(22) Filed: Jan. 22, 2018

(65) Prior Publication Data

US 2019/0228156 A1    Jul. 25, 2019

(51) Int. Cl.

| G06F 15/16 | (2006.01) |
|---|---|
| G06F 21/57 | (2013.01) |
| G06F 16/903 | (2019.01) |
| G05B 23/02 | (2006.01) |
| G06F 21/44 | (2013.01) |
| G06F 21/50 | (2013.01) |
| G05B 19/042 | (2006.01) |

(52) U.S. Cl.
CPC ......... *G06F 21/57* (2013.01); *G05B 19/0428* (2013.01); *G05B 23/0291* (2013.01); *G06F 16/903* (2019.01); *G06F 21/44* (2013.01); *G06F 21/50* (2013.01); *G05B 2219/24042* (2013.01); *G05B 2219/25061* (2013.01); *G05B 2219/25074* (2013.01)

(58) Field of Classification Search
CPC ........ G06F 21/15; G06F 16/903; G06F 21/50; G05B 19/0428; G05B 23/0291
USPC ................................................. 709/223, 224
See application file for complete search history.

(56) References Cited

U.S. PATENT DOCUMENTS

| 5,794,062 A | * | 8/1998 | Baxter | ........... | G06F 8/447 |
| | | | | | 712/30 |
| 7,107,326 B1 | * | 9/2006 | Fijolek | ........... | H04L 61/2015 |
| | | | | | 709/220 |
| 7,890,300 B2 | | 2/2011 | De Groot et al. | | |
| 2002/0178211 A1 | * | 11/2002 | Singhal | ........... | H04L 29/06 |
| | | | | | 709/201 |

(Continued)

FOREIGN PATENT DOCUMENTS

| DE | 10326665 A1 | 1/2005 |
|---|---|---|
| DE | 102008024979 A1 | 11/2009 |

(Continued)

OTHER PUBLICATIONS

European Search Report for EP application No. 19150418.2 dated Jun. 19, 2019.

*Primary Examiner* — David R Lazaro
*Assistant Examiner* — Mariegeorges A Henry
(74) *Attorney, Agent, or Firm* — Coats + Bennett, PLLC

(57) ABSTRACT

A configuration manager is associated with a Networked Control System (NCS) comprising a plurality of sensors and actuators. The configuration manager automatically discovers the hardware and/or software configurations of the sensors and actuators, and analyzes that information in order to detect whether any of the sensors and actuators have been tampered with. Provided the configuration manager detects such tampering, the configuration manager indicates the tampering to a control manager of the NCS, which then functions to minimize potential damage to the NCS.

20 Claims, 7 Drawing Sheets

(56) References Cited

U.S. PATENT DOCUMENTS

| | | | |
|---|---|---|---|
| 2011/0047300 A1* | 2/2011 | Soennichsen | G05B 19/0428 |
| | | | 710/16 |
| 2011/0112718 A1 | 5/2011 | Claus et al. | |
| 2014/0115346 A1* | 4/2014 | Ekberg | G06F 21/10 |
| | | | 713/193 |
| 2015/0113638 A1 | 4/2015 | Valasek et al. | |
| 2017/0052838 A1* | 2/2017 | Moore | G01R 31/00 |
| 2019/0011904 A1* | 1/2019 | Wyman | H04L 63/1441 |

FOREIGN PATENT DOCUMENTS

| | | |
|---|---|---|
| EP | 2284634 A1 | 2/2011 |
| EP | 2463736 A2 | 6/2012 |

* cited by examiner

AUTOMATIC TAMPERING DETECTION IN NETWORKED CONTROL SYSTEMS

The present disclosure relates generally to the field of networked control systems (NCSs), and more particularly to devices and methods for automatically detecting tampering within NCSs.

BACKGROUND

Networked Control Systems (NCSs) are closed loop systems in which sensors and actuators communicate with a controller via a communications network. Such systems are used, for example, to monitor and control the functions and processes that occur in a variety of different settings that include, but are not limited to, autonomous systems, manufacturing plants, chemical and nuclear plants, and environmental control systems, as well as those that are utilized on or with aircraft and satellites. With most NCSs, the controller performs the monitoring and control functions by exchanging feedback information and control signals with the different sensors and actuators in the system. However, to properly perform these functions, the controller, the sensors, and the actuators should all have each other's correct and most current configuration information. Discrepancies in the configuration information between these components can increase the risk of a system malfunction.

BRIEF SUMMARY

Aspects of the present disclosure relate to methods and apparatuses for automatically discovering the hardware and/or software configurations of the various components of a Networked Control System (NCS), and for automatically detecting whether these components have been tampered with. Such components can include, but are not limited to, sensors, actuators, and other automated devices capable of performing an automated or predetermined process or function. According to the present disclosure, these aspects may be implemented by a computing device communicatively positioned in the NCS between the sensors, actuators, and other automated devices, and a control manager configured to manage the operation of the NCS components.

According to an aspect of the present disclosure, a configuration management device is in an automated system having a plurality of network components and a control manager that manages the plurality of network components. In this aspect, the configuration management device comprises a communications interface and processing circuitry operatively connected to the communications interface. The communications interface is configured to communicate with the plurality of network components and with the control manager. The processing circuitry is configured to detect a discrepancy in configuration data received from a network component based on a comparison of the configuration data with reference configuration data stored in a database, and responsive to detecting the discrepancy, send a tamper detection signal to the control manager indicating that the network component has been tampered with.

In one aspect, one of the configuration data and the reference configuration data is software configuration data, and the other of the configuration data and the reference configuration data is hardware configuration data.

To detect a discrepancy in the configuration data received from the network component, one aspect of the processing circuitry is configured to detect that the control manager is using an incorrect software component to control the network component.

To detect a discrepancy in the configuration data received from the network component, another aspect of the processing circuitry is configured to detect that the control manager is using incorrect configuration parameters to control the network component.

To detect a discrepancy in the configuration data received from the network component, another aspect of the processing circuitry is configured to detect that the control manager is using an incorrect configuration for the network component to interpret signals received from the network component.

In one aspect, the tamper detection signal causes the control manager to either suspend operation of the network component, or switch from communicating with the network component to communicating with a redundant network component.

In one aspect, based on the comparison of the configuration data with the reference configuration data, the processing circuitry is further configured to detect that no discrepancy in the configuration data received from a network component.

In these cases, the processing circuitry is configured to monitor characteristics of data sent by the network component to the control manager while the network component is in an operational mode, detect a discrepancy in the characteristics of the data sent by the network component based on a comparison to reference characteristics stored in the database, and send the tamper detection signal to the control manager indicating that the network component has been tampered with responsive to detecting the discrepancy in the characteristics of the data sent by the network component.

In one aspect, the characteristics of the data sent by the network component comprise one or more of a signal pattern, a rate at which the network component sends the data to the control manager, and a type of signal that is sent from the network component to the control manager.

In one aspect, the network component comprises one of a sensor and an actuator.

In one aspect of the present disclosure, a method of controlling an automated system comprising a plurality of network components and a control manager that manages the plurality of network components comprises detecting a discrepancy in configuration data received from a network component based on a comparison of the configuration data with reference configuration data stored in a database, and responsive to detecting the discrepancy, indicating that the network component has been tampered with to the control manager.

In one aspect, the method further comprises determining whether the network component is one of a recognized network component and an unrecognized network component.

In one aspect, the method further comprises comparing the configuration data with the reference configuration data responsive to determining that the network component is a recognized network component.

In one aspect, the method further comprises indicating that the network component has been tampered with to the control manager responsive to determining that the network component is an unrecognized network component.

In one aspect, the method further comprises detecting that no discrepancy exists in the configuration data. Responsive to detecting that no discrepancy exists in the configuration data, the method further comprises monitoring characteristics of data sent by the network component to the control manager while the network components are in an operational mode, detecting a discrepancy in the characteristics based on a comparison of the characteristics to reference characteristics stored in the database, and indicating that the network component has been tampered with to the control manager responsive to detecting the discrepancy in the characteristics.

In one aspect, one of the configuration data and the reference configuration data is software configuration data, and the other of the configuration data and the reference configuration data is hardware configuration data.

In one aspect, indicating that the network component has been tampered with to the control manager comprises generating and sending a tamper detection message to the control manager. In such aspects, the tamper detection message comprises information identifying the network component, and an indicator that causes the control manager to either suspend operation of the network component, or to switch from communicating with the network component to communicating with a redundant network component.

In one aspect, the method further comprises sending a request message for the configuration data to one or more of the plurality of network components, and receiving a response message from the network component. In these aspects, the response message comprises the configuration data of the network component.

In one aspect, the method further comprises inspecting a header of the response message, determining a protocol used by the network component to send the response message, and processing the response message to obtain the configuration based on the determined protocol.

In one aspect, the present disclosure provides a non-transitory computer readable medium storing a computer program product configured to control a programmable computing device. In such aspects, the computer program product comprises software instructions that, when executed on processing circuitry of the programmable computing device, cause the processing circuitry to detect a discrepancy in configuration data received from a network component based on a comparison of the configuration data with reference configuration data stored in a database, and responsive to detecting the discrepancy, send a tamper detection signal to the control manager indicating that the network component has been tampered with.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure relate to an apparatus and corresponding method for automatically discovering the hardware and/or software configurations of the sensors, actuators, and other automated devices that comprise a Networked Control System (NCS), and for automatically detecting whether these NCS components have been tampered with. According to the present disclosure, tampering is detected by performing an analysis of the software and/or hardware configuration information for each of the NCS components in the system at a configuration manager device. Should tampering be detected, aspects of the present disclosure are configured to automatically suspend and/or cease the operations and processes of "tampered-with" components, and in some cases, activate redundant components to avoid a possible catastrophe.

The aspects described herein are suitable for use in many different types of systems, plants, and assemblies. By way of example only, aspects of the present disclosure could be utilized to monitor and control the sensors and actuators associated with robotic assemblies, autonomous systems, environment control systems, systems used in the manufacturing of, or systems used on, aircraft and spacecraft, or even chemical processes performed at a chemical plant. Typically, there are many thousands (and in some cases millions) of sensors, actuators, and automated devices employed by these types of systems, which makes monitoring and controlling the operation of each of these components difficult and complex. However, in accordance with the various aspects of the present disclosure, the need to manually monitor and detect whether the sensors and actuators of the NCS have been tampered with is greatly reduced or eliminated, thereby saving money, improving the safety of operations, and increasing the quality and reliability of any products and/or services produced by such systems and plants.

Figure 1:
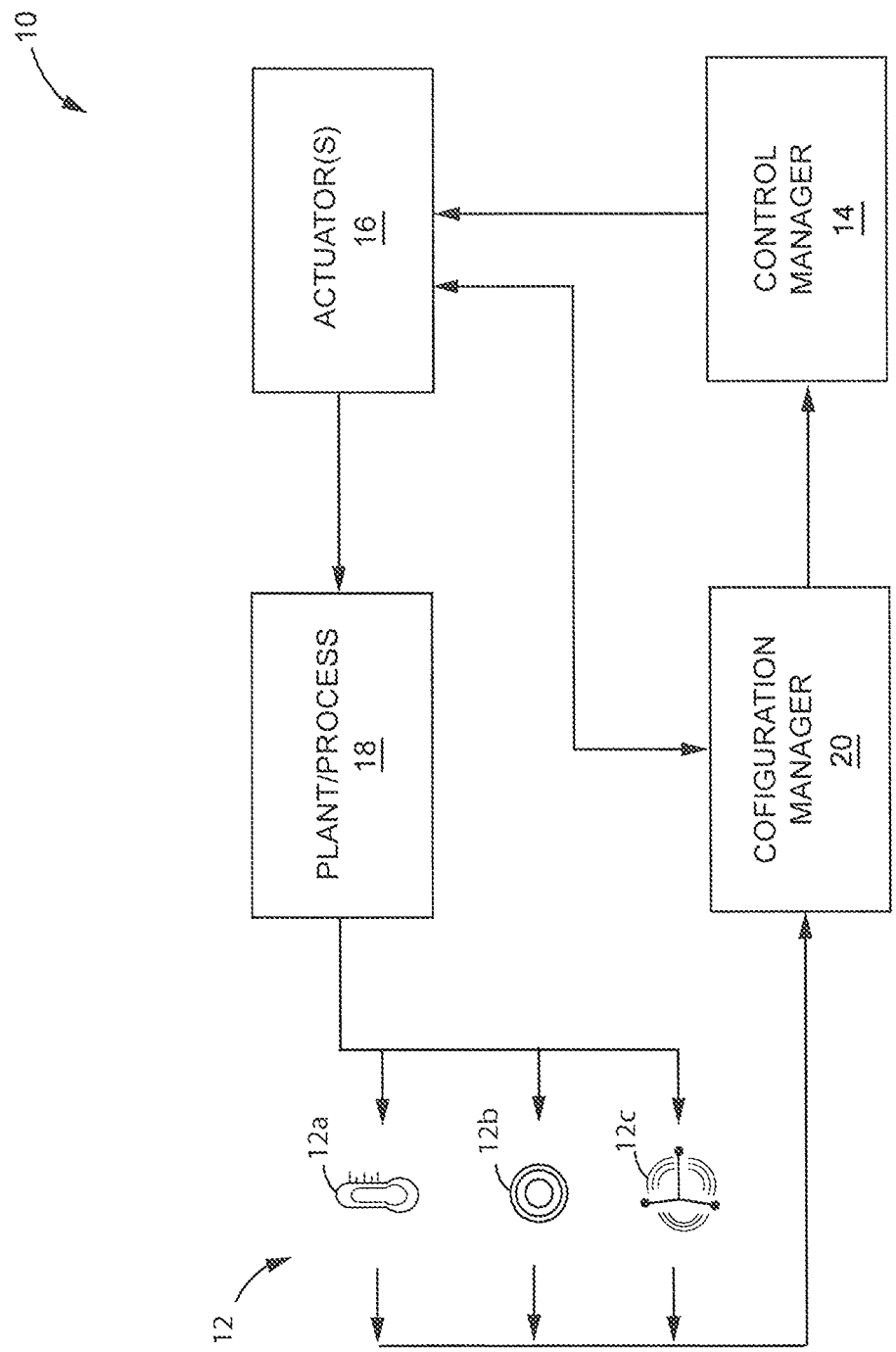
FIG. 1 illustrates a Networked Control System (NCS) configured according to one aspect of the present disclosure.

Turning now to the drawings, FIG. 1 illustrates an NCS 10 configured according to one aspect of the present disclosure. Those of ordinary skill in the art should appreciate that the components seen in FIG. 1 and disclosed herein are illustrative only, and that NCS 10 can comprise other needed and/or desired components not specifically identified or mentioned.

As seen in the aspect of FIG. 1, NCS 10 comprises multiple networked components including one or more sensors 12a, 12b, 12c (collectively, "12"), a control manager 14, one or more actuators 16, a plant/process 18, and a configuration manager 20. Each of these components is communicatively connected via one or more wireless and/or wired communication networks that utilize any known transmission protocol or combination thereof to exchange information and signals. Such protocols include, but are not limited to, TCP/IP, BACnet, Modbus, IEEE 802.xx, Infra-Red, and BLUETOOTH.

The sensors 12 comprise one or more devices and/or hardware circuits configured to measure corresponding characteristics of the physical environment in which they operate. The sensors 12 can be the same or different devices, and thus, can be configured to sense or measure the same or different characteristics at or during any time interval needed or desired. By way of example only, the NCS 10 of FIG. 1 illustrates sensors 12 as comprising one or more thermometers 12a configured to measure temperature, one or more optical sensors 12*b* configured to measure light (or lack thereof), and one or more accelerometers 12*c* configured to measure the acceleration of an object to which the NCS 10 is connected. Other sensors are certainly possible, even though, for simplicity sake, they are not expressly shown in the Figures. Such sensors include, but are not limited to, gyroscopes, pressure sensors, tilt sensors, proximity sensors, speed sensors, acoustic sensors, sensors associated with navigational equipment, force sensors, density sensors, environmental sensors, chemical sensors, and the like.

The control manager 14 is a computing device configured to monitor the health and operation of each of the components comprising NCS 10, and to control the operation of those components. In one aspect, the control manager 14 receives the signals and information from each of the sensors 12 indicating their respective measurements. The signals and information can be received by the control manager 14 periodically as part of an automated measurement cycle, in response to an explicit request sent to the sensors 12, or both. Regardless of the time interval, however, control manager 14 is configured to analyze the signals and information received from the sensors 12. Based on the analysis, control manager 14 generates and sends corresponding control signals to control the various different components of NCS 10 in accordance with the analysis.

By way of example only, consider a situation where control manager 14 receives a signal from thermometer 12*a* indicating that a primary power supply (not shown) with which thermometer 12*a* is associated is overheating. Responsive to determining the overheating condition, control manager 14 could generate and send a control signal or set of control signals to the primary power supply causing it to power down, go "off-line," or otherwise cease or suspend operation. Additionally, or alternatively, control manager 14 can generate and send a different control signal or set of control signals to a "back-up" (i.e., redundant) power supply to automatically activate that particular redundant component.

Actuator 16 comprises one or more actuators associated with the NCS 10. Such actuators 16 can be any type of actuators needed or desired, and that are configured to perform some function. For example, according to various aspects of the disclosure, suitable actuators include, but are not limited to, pneumatic actuators, electrical actuators, thermal actuators, mechanical actuators, linear actuators, and rotary actuators. Regardless of the particular type or function of an actuator 16, however, these actuators 16 can be used to actuate a process, operation, or function performed by the plant/process 18, and is controlled by one or more control signals that are generated by, and received from, control manager 14. As stated previously, such control signals are generated and sent by the control manager 14 responsive to receiving the measurement signals and information from sensors 12. Thus, control manager 14 can utilize the measurement signals and information to suspend or cease the functionality of actuators 16, and/or activate a redundant actuator 16.

The plant/process 18 comprises a device or system of devices (e.g., an assembly) that are also controlled by control manager 14 responsive to the measurement signals and information received from sensors 12. In one aspect, for example, the plant/process 18 can comprise a robotic arm assembly having an actuator 16. The operation of the robotic arm assembly, therefore, is controlled by the control manager 14 via the actuator 16 responsive to an analysis performed on measurement signals and information received from one or more of the sensors 12. The plant/process 18 can be any type of plant or process needed or desired, and can include devices and systems such as a robotic arm, autonomous systems, an aircraft environmental control system, a chemical process performed by equipment in a chemical plant, a manufacturing process in a manufacturing plant, and the like.

The configuration manager 20 is communicatively interposed between the sensors 12, the actuators 16, and the control manager 14. In one aspect, configuration manager 20 comprises a stand-alone computing device communicatively connected to the network. In other aspects, configuration manager 20 and control manager 14 execute on the same computing device. Regardless of whether the configuration manager 20 is a stand-alone device, or comprises a function that executes concurrently with the control manager 14 on the same computing device, however, configuration manager 20 automatically discovers the software and/or hardware configuration settings for each of the sensors 12 and actuators 16, and then monitors the configuration information of the sensors 12 and actuators 16 to automatically determine whether any of these components have been tampered with. If and when the configuration manager 20 detects an anomaly in the configuration information of a sensor 12 and/or actuator 16, which can indicate potential tampering, configuration manager 20 generates and sends one or more tamper detection signals to control manager 14 to cause that device to suspend or cease the operation of that particular sensor 12 and/or actuator 16.

Additionally, in one aspect of the present disclosure, the tamper detection signal sent by the configuration manager 20 also causes the control manager 14 to generate one or more control signals to replace the functionality of a "tampered-with" component. More particularly, upon receiving the tamper detection signal, control manager 14 generates the control signals required to activate a redundant component, and then switches from communicating with the "tampered-with" component to communicating with the newly-activated redundant component. Controlling the operation of the control manager 14 in this manner communicatively isolates the "tampered-with" component from the network and communicatively inserts the newly activated redundant component into the network, thereby allowing the newly activated redundant component to communicate and/or be controlled by the control manager 14.

For example, consider a situation where configuration manager 20 detects that accelerometer 12*c* has likely been tampered with. In such cases, configuration manager 20 would generate and send a tamper detection signal to the control manager 14 indicating the tampering. Control manager 14 would then, in turn, generate and send one or more control signals to accelerometer 12*c* to bring the accelerometer 12*c* "off-line," effectively isolating the accelerometer 12*c* from communicating any further measurement signals and information to the control manager 14. Then, control manager 14 could generate and send the control signals needed to activate a predetermined replacement accelerometer 12*c*. Once activated, configuration manager 20 would ensure that the replacement accelerometer 12*c* and the control manager 14 have the current software and/or hardware configuration settings, and then control one or both of the newly-activated accelerometer 12*c* and the control manager 14 to begin communicating with each other in a normal operational mode.

Figure 2:
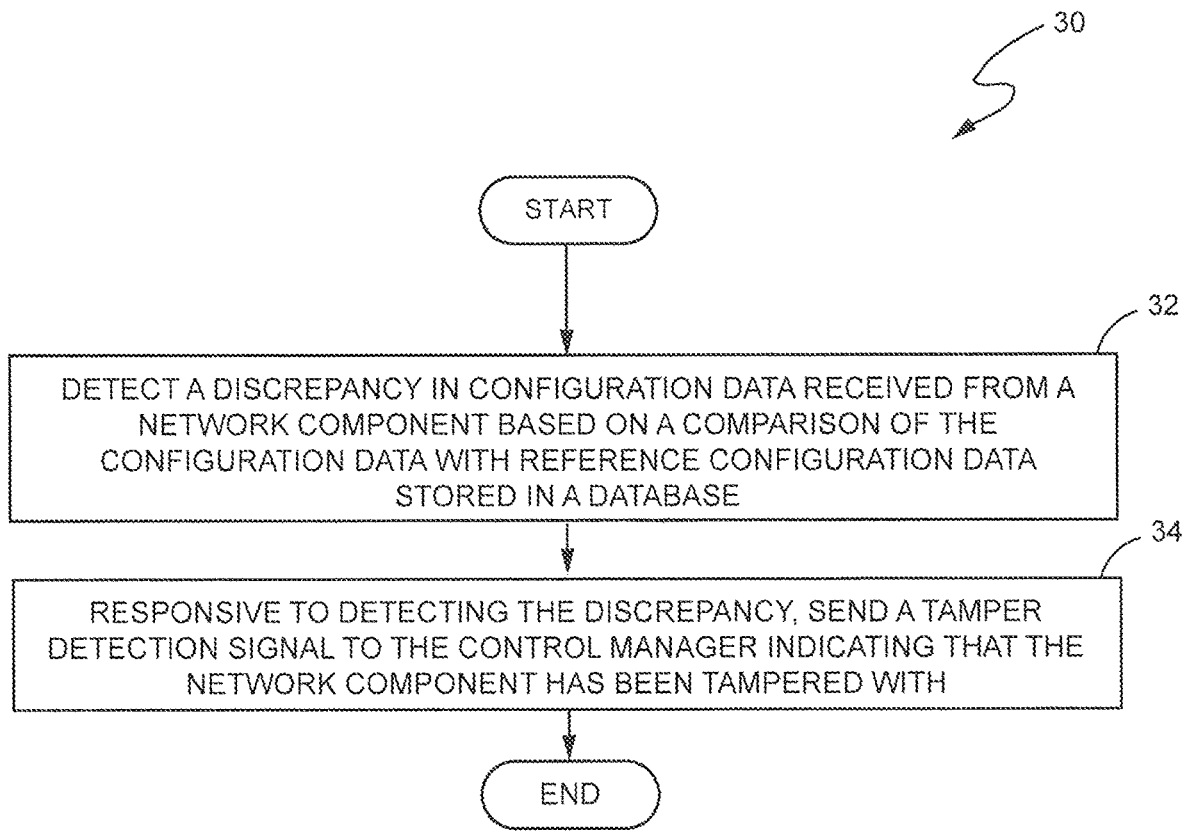
FIG. 2 is a flow diagram illustrating a method for handling a sensor or actuator that has been tampered with according to one aspect of the present disclosure.

FIG. 2 is a flow diagram illustrating a method 30, implemented at configuration manager 20, for handling an NCS component (e.g., sensor 21 and/or actuator 16) that has been tampered with according to one aspect of the present disclosure. As seen in FIG. 2, configuration manager 20 first detects a discrepancy in configuration data that has been received from a network component—for example, sensor 12a or actuator 16 (box 32). According to the present disclosure, configuration discrepancies can indicate tampering and can be detected using various methods. In this aspect, however, any configuration discrepancies, and thus, tampering, are detected by configuration manager 20 based on the results of a comparison of the configuration data received from the network component and reference configuration data retrieved for the network component. The reference configuration data, which is stored in a database accessible to the configuration manager 20, comprises a set of expected software and/or hardware configuration parameter values for the network component. Generally, each network component in NCS 10 has its own set of reference configuration data; however, the present disclosure is not so limited. In some aspects, the same or similar types of network components can share the same or similar set of reference configuration data.

In one aspect, for example, a discrepancy is determined when the comparison performed by the configuration manager 20 reveals that one or more parameters in the configuration data received from the network component deviates from one or more corresponding parameters in the reference configuration data by a predefined threshold amount (e.g., 5%). Alternatively, or additionally, configuration manager 20 can determine such configuration discrepancies whenever the value of a particular configuration parameter received from the network component deviates from the expected value in the corresponding configuration parameter stored in the reference configuration data. In these aspects, some configuration parameters can be considered more critical than configuration parameters for effecting communication with, and control of, the network component. Therefore, one aspect of the present disclosure prioritizes the configuration parameters for the network components in order of importance. Thereafter, for any given network component, the configuration manager 20 interprets any deviation of a prioritized parameter from the corresponding expected configuration parameter stored in the reference configuration data, however slight, as tampering.

Regardless of how the configuration discrepancies are detected, however, configuration manager 20 is configured to interpret such discrepancies as tampering, and as such, sends a "tamper detection signal" to the control manager 14 (box 34). The tamper detection signal, in one aspect, comprises a message that identifies the particular network component that has been tampered with, and in some aspects, includes both the various configuration data provided by the network component and the set of reference configuration data (or link thereto) that was used in the comparison. So informed, the control manager 14 can temporarily or permanently suspend or cease the operation of the affected network component, and/or replace the functionality of that network component in NCS 10 by activating a redundant network component, as previously described.

Figure 3A:
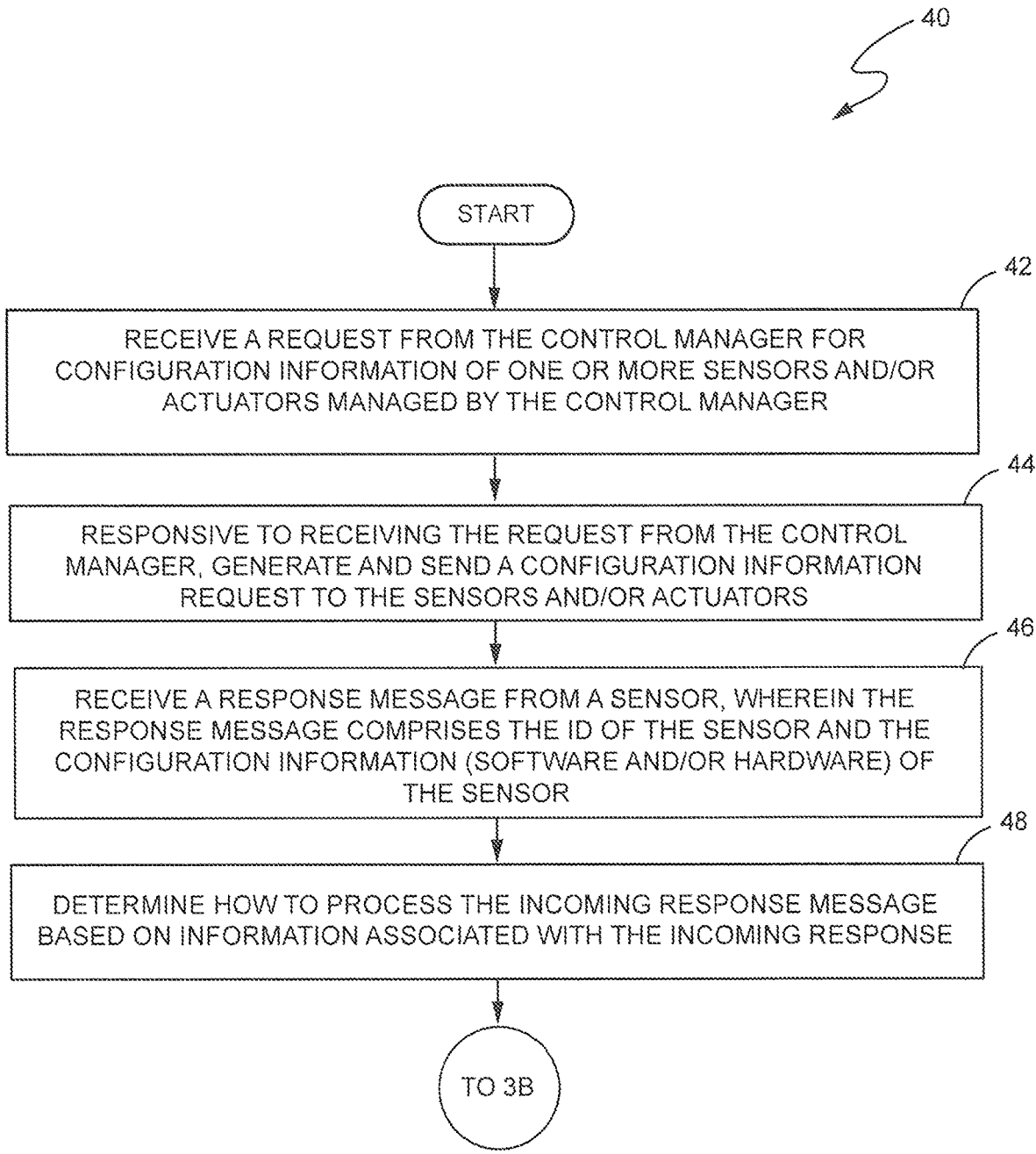
FIGS. 3A-3C are flow diagrams illustrating a method for detecting whether a sensor or actuator has been tampered with, and controlling the functions of the sensor or actuator due to the detected tampering according to one aspect of the present disclosure.
Figure 3B:
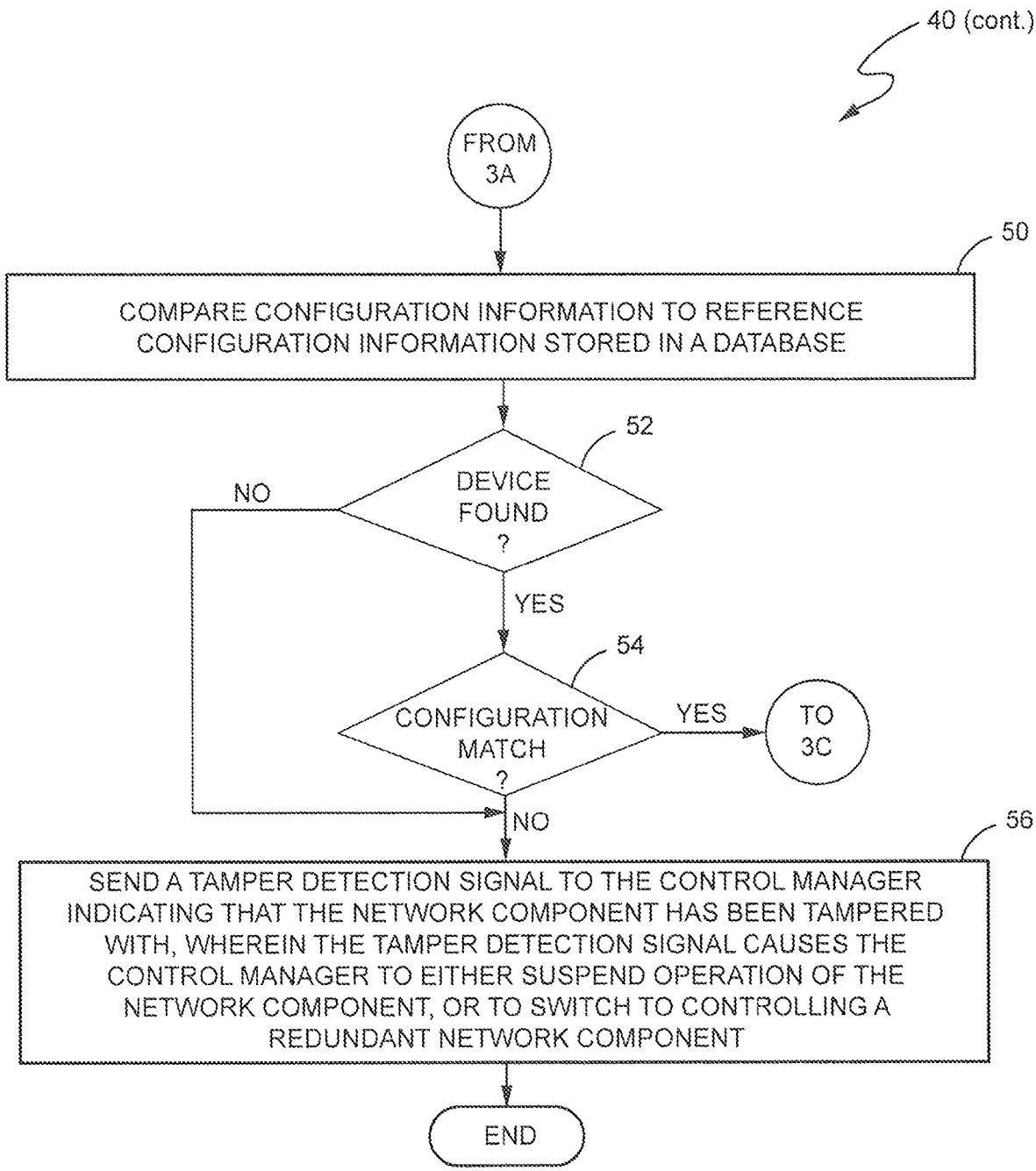
Figure 3C:
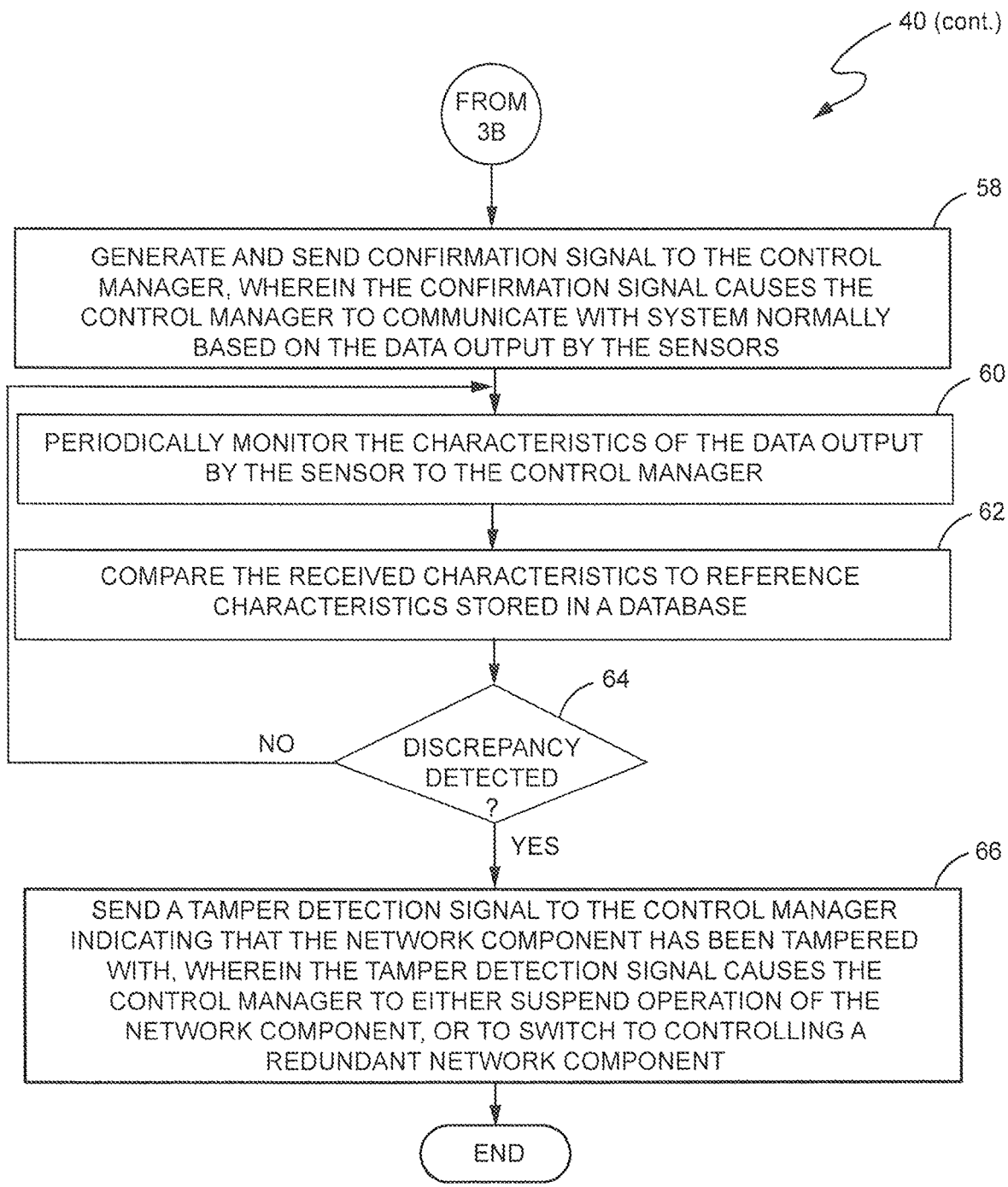

FIGS. 3A-3C illustrate a method 40 for detecting whether a network component (e.g., sensor 12a and/or an actuator 16) has been tampered with, and for controlling the functions of that network component due to the detected tampering according to one aspect of the present disclosure. As above, the aspects illustrated by method 40 are implemented at the configuration manager 20, which can be a stand-alone computing device or a shared computing device that also implements the functionality of the control manager 14.

Method 40 begins with the configuration manager 20 receiving a request from the control manager 14 to obtain the configuration data for one or more sensors 12 and one or more actuators 16 managed by control manager 14 (box 42). In some aspects, the request message comprises information that identifies one or more particular sensors 12 (e.g., sensor 12a) and/or one or more particular actuators 16 for which configuration data is needed. In other aspects, however, the request message comprises a command, instruction, or message that causes the configuration manager 20 to obtain the configuration data from all sensors 12 and actuators 16 managed by control manager 14. In either case, however, configuration manager 20 generates and sends a configuration information request message to the sensors 12 and/or actuators 16 responsive to receiving the request from control manager 14 (box 44).

In response to sending the configuration request message(s), configuration manager 20 will receive a response message from the sensors 12 and actuators 16 (box 46). In one aspect, each response message comprises data identifying the particular sensor 12 or actuator 16 (e.g., a device ID or network address) that sent the response message, as well as one or more parameter values that identify the current configuration (i.e., hardware and/or software) of the sensor 12 or actuator 16. Other information and data is also possible. Once configuration manager 20 has received an incoming response message from a given sensor 12 or actuator 16, configuration manager 20 uses the information in the response message to determine how to process the response message (box 48).

For example, it is possible that one or more of the sensors 12 and/or one or more of the actuators 16 in NCS 10 communicate with other devices in NCS 10, such as the configuration manager 20 and control manager 14, utilizing disparate protocols. Additionally, or alternatively, it is possible that one or more of the sensors 12 and/or actuators 16 utilize different formats to report their respective configuration data. The use of varying formats can be due to the fact that the sensors 12 and actuators 16 are made by various third party manufacturers. Even in cases where these components are provided by the same manufacturer, the formats utilized by sensors 12 and/or actuators 16 to store and/or report configuration data can change with manufacturer updates to the component's software and/or hardware. Therefore, to handle such disparities, one aspect of the present disclosure configures configuration manager 20 to analyze the headers of the incoming response messages. Based on the information contained in the header, and/or the formatting of the information in the header, configuration manager 20 can determine how to process (e.g., parse) the information in a given incoming response message to extract the desired configuration parameter data.

Once the configuration parameter information has been identified and extracted or copied from the incoming message, configuration manager 20 compares the received configuration information to the reference configuration information for the particular sensor 12 or actuator 16 that sent the response message (box 50). For example, in one aspect, the configuration manager 20 utilizes the ID of the particular sensor 12 or actuator 16 that sent the response message as an index into a database of reference configuration files (box 52). If the configuration information for the network component cannot be located in the database, configuration manager 20 assumes that the particular sensor 12 or actuator 16 that sent the response message has been tampered with, is invalid, or does not belong on the network. At any rate, the absence of reference configuration information for the particular sensor 12 or actuator 16 indicates that there is no configuration information on which control manager 14 can base its control of the component. In these scenarios, therefore, configuration manager 20 simply generates and sends a tamper detection signal to the control manager 14 (box 56). As stated above, the tamper detection signal indicates to the control manager 14 that the sensor 12 or actuator 16 that sent the response message has been tampered with, and causes the control manager 14 to temporarily or permanently suspend or halt the operation of that component. Additionally, in some aspects, the tamper detection signal can cause the control manager 14 to temporarily or permanently replace the functionality of a "tampered-with" sensor 12 or actuator 16 with a redundant sensor 12 or actuator 16 by activating the redundant sensor 12 or actuator 16.

If, however, the configuration manager 20 does locate the reference configuration information for the particular sensor 12 or actuator 16 in the database, configuration manager 20 will compare the configuration information received in the response message to the reference configuration information (box 54). If the comparison reveals that the configuration information received in the response message does not match the reference configuration information to within a predefined threshold (e.g., 5%), or that the values of one or more "prioritized" configuration parameters do not match the expected values of the corresponding configuration parameters in the reference configuration information, configuration manager 20 will generate and send a tamper detection signal to the control manager 14, as previously described (box 56).

However, if the comparison reveals a match between the configuration information (box 54), configuration manager 20 generates and sends a configuration confirmation signal to control manager 14 (box 58). The configuration confirmation signal generated and sent to the control manager 14 indicates that the particular sensor 12 or actuator 16 is "valid" and has not been tampered with. Because of such confirmation, control manager 14 can begin communicating with the particular sensor 12 or actuator 16 normally with a high degree of confidence, and generate the control signals required to control the operation of that component. Such control, as stated above, is based on the measurement data sent by the sensors 12 and/or actuators 16.

Once the sensors 12 and actuators 16 are communicating normally with control manager 14, configuration manager 20 is configured to periodically monitor the operations of sensors 12 and actuators 16 to determine whether any of those devices have been tampered with (box 60). By way of example only, configuration manager 20 is configured, in one aspect, to intercept measurement data and other information from sensors 12 and/or actuators 16. Based on time-qualified analysis of the received data, configuration manager 20 can determine whether the sensors 12 or actuators 16 reporting the configuration and data information are operating normally or abnormally.

For example, configuration manager 20 can base its determination on a variety of different characteristics including, but are not limited to, the measurement data provided by a sensor 12, the changes in the characteristics or patterns of the signals output by a sensor 12 or actuator 16 (e.g., whether the signal is an oscillating signal or a flat signal), a detected rate of change in a signal provided by a sensor 12 or actuator 16, an unexpected change in the intervals at which such signals are provided, a change in signal type provided by the sensor 12 or actuator 16, and the like. In particular, configuration manager 20 can compare the received characteristics to a set of reference characteristics stored in a database (box 62) to determine whether an unexpected change in those characteristics has occurred. If, as a result of the comparison, the configuration manager 20 detects an unexpected change in the operating characteristics of the sensor 12 and/or actuator 16 (box 64), configuration manager 20 will generate and send a tamper detection signal to control manager 14, as previously described (box 66). Otherwise, configuration manager 20 continues to periodically monitor the operating characteristics of the sensors 12 and/or actuators 16 (box 60).

Figure 4:
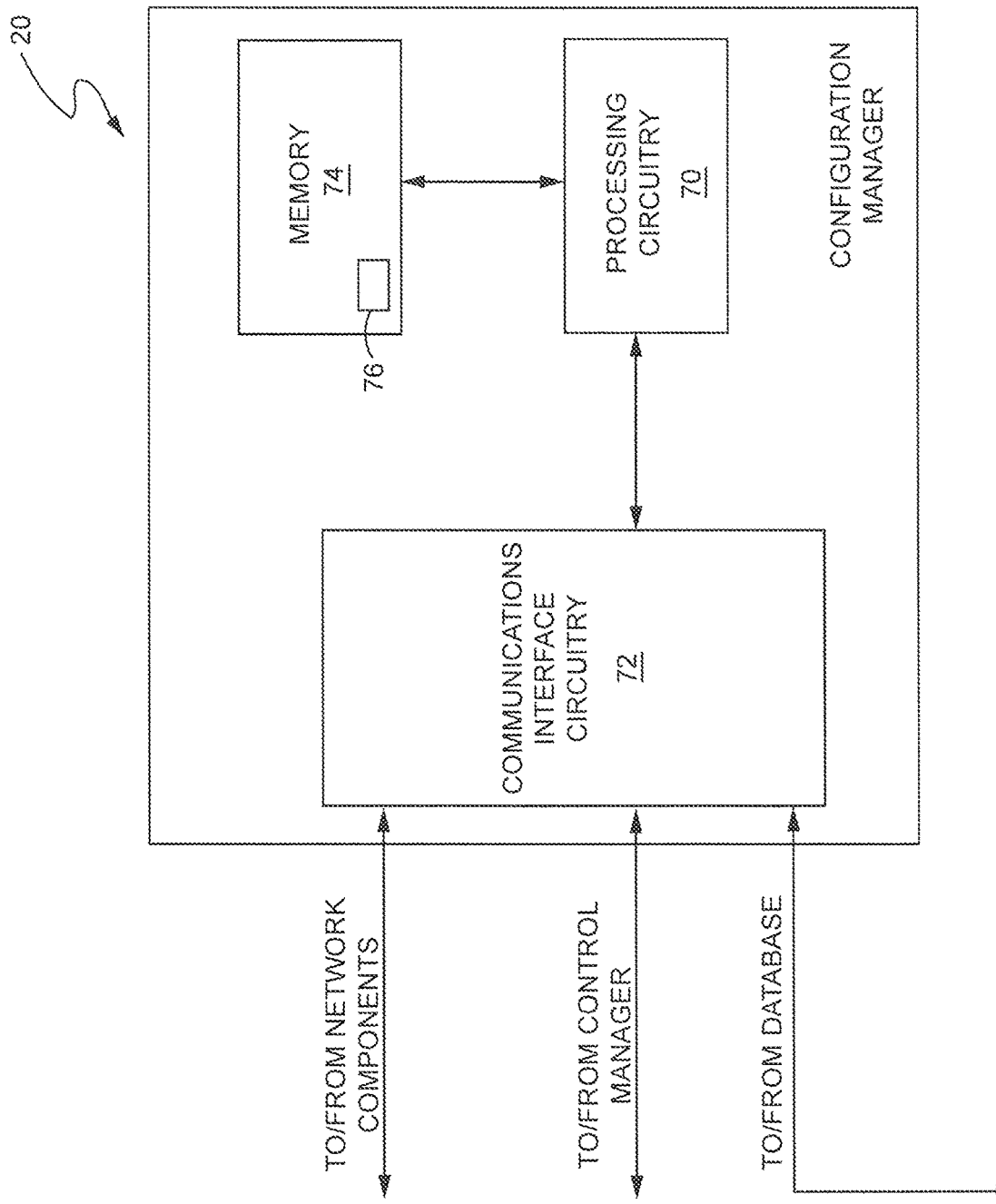
FIG. 4 is a functional block diagram illustrating a configuration manager device configured according to one aspect of the present disclosure.

As previously stated, the configuration manager 20 of the present disclosure is implemented as one or more computing devices, such as one or more workstations or a network-based computer servers (e.g., application servers), for example. FIG. 4 is a functional block diagram illustrating some of the components comprising one such configuration manager 20 configured according to one aspect of the present disclosure.

As seen in FIG. 4, configuration manager 20 comprises processing circuitry 70 communicatively coupled via one or more busses to communications interface circuitry 72 and memory 74. According to various aspects of the present disclosure, processing circuitry 70 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 70 includes programmable hardware capable of executing software instructions stored, e.g., as a machine-readable configuration management control program 76 in memory 74, to implement the aspects of the present disclosure.

More particularly, according to the present disclosure, processing circuitry 70 is configured to execute a configuration management control program 76 to implement the aspects of the disclosure previously described. Such aspects include, but are not limited to, detecting whether one or more sensors 12 and/or one or more actuators 16 have been tampered with based on the results of a comparison between the configuration information of those devices and reference configuration information stored at a database, and sending a tamper detection signal to a control manager 14 responsive to detecting such tampering.

Communications interface circuitry 72 comprises circuitry configured to allow the configuration manager 20 to communicate data and information with one or more remotely located devices. As previously described, these devices include the sensors 12, the control manager 14, the actuators 16, and the plant/process 18 that comprise the NCS 10, as well as a database (not shown) to retrieve reference configuration information. Generally, communications interface circuitry 72 comprises an ETHERNET card or other circuit specially configured to allow configuration manager 20 to communicate data and information over a computer network. However, in other aspects of the present disclosure, communications interface circuitry 72 includes a transceiver configured to send and receive communication signals to and from another device via a wireless network. In some aspects, communications interface circuitry 72 comprises the necessary hardware and software to allow configuration manager 20 to communicate with some devices over a wireless network and with other devices over a wireless network.

Memory 74 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 4, memory 74 is configured to store the configuration management control program 76 executed by processing circuitry 70 to perform the aspects of the present disclosure previously described.

Figure 5:
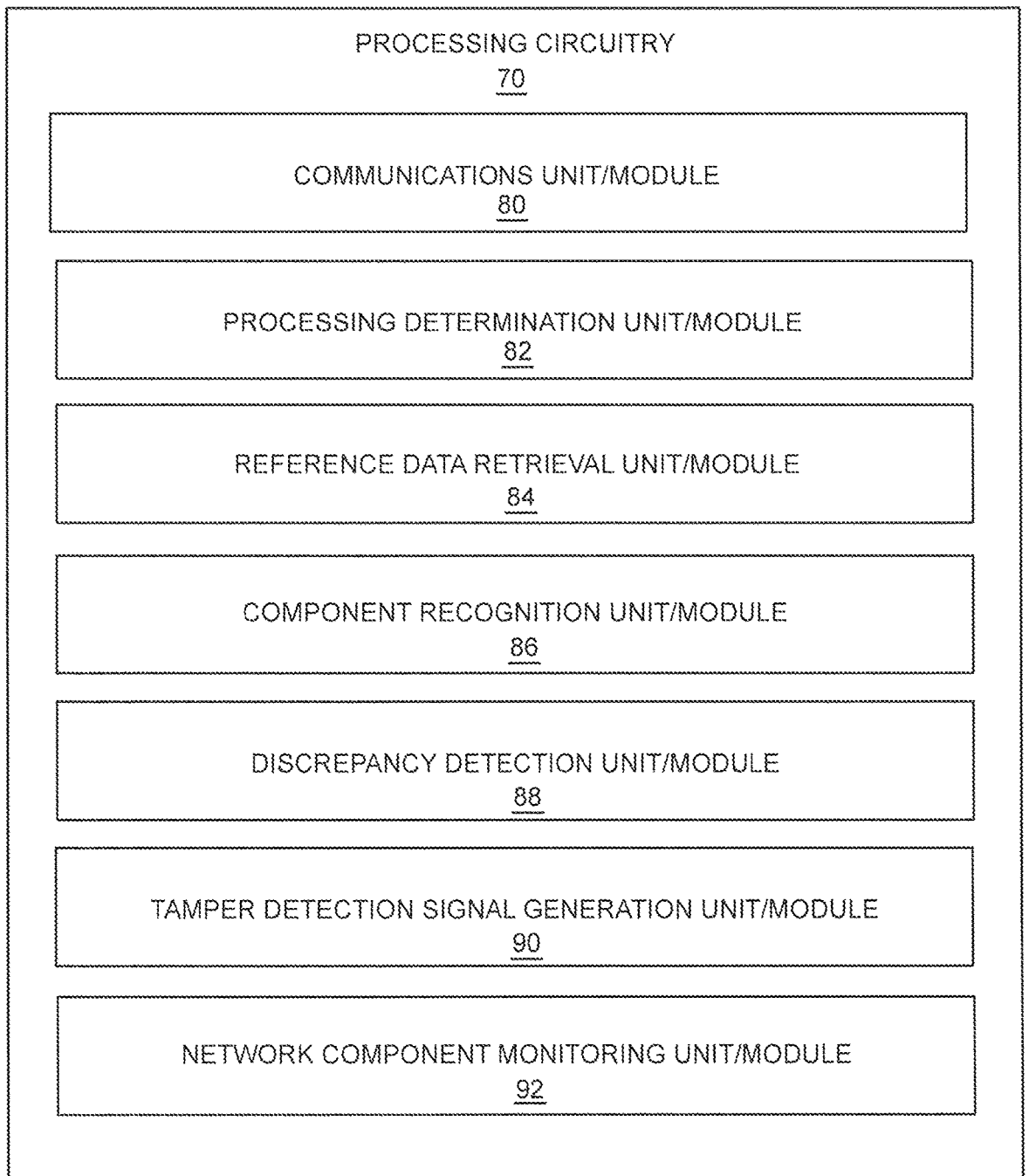
FIG. 5 is a functional block diagram illustrating the functional modules and/or units comprising the processing circuitry of a configuration manager device according to one aspect of the present disclosure.

FIG. 5 is a functional block diagram illustrating the functional modules and/or units comprising the processing circuitry 70 of a configuration manager 20 according to one aspect of the present disclosure. As seen in FIG. 5, processing circuitry 70 implements a communications unit/module 80, a processing determination unit/module 82, a reference data retrieval unit/module 84, a component recognition unit/module 86, a discrepancy detection unit/module 88, a tamper detection signal generation unit/module 90, and network component monitoring unit/module 92.

The communications unit/module 80 is configured to establish and maintain communications paths with each of the sensors 12, control manager 14, actuators 16, plant/process 18, and the database that stores the reference configuration information. Additionally, the communications unit/module 80 is configured to send request messages to the sensors 12 and actuators 16 for configuration information, and receive response messages comprising the requested configuration information from sensors 12 and actuators 16.

The processing determination unit/module 82 is configured to analyze the incoming response messages received from sensors 12 and actuators 16 to determine how to process the configuration information. The analysis can comprise, for example, a deep inspection of the contents of received packets and/or an inspection of the packet headers. Other methods are also possible, so long as those methods allow the processing determination unit/module 82 to identify a processing path for processing the incoming configuration information. The reference data retrieval unit/module 84 is configured to retrieve the reference configuration information for each sensors 12 and actuator 16 from a database or other storage medium. The component recognition unit/module 86 is configured to determine the identity of the particular sensor 12 and/or actuator 16 that sent the incoming response message. Such information is useful for assisting the reference data retrieval unit/module 84 in retrieving the correct reference configuration information.

The discrepancy detection unit/module 88 is configured to compare the configuration information received from the various sensors 12 and actuators 16 to the appropriate reference configuration. The tamper detection signal generation unit/module 90 is configured to generate a tamper detection signal based on the results of the comparison performed by discrepancy detection unit/module 88, and send the generated tamper detection signal to the control manager 14. The network component monitoring unit/module 92 is configured to monitor the various sensors 12 and actuators 16 in NCS 10 during normal operation to detect whether any of the sensors 12 and actuators 16 are tampered with during normal operation.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

The foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A configuration management device in a closed-loop, Networked Control System (NCS), wherein the NCS comprises a plurality of network components and control management circuitry that manages the plurality of network components, the configuration management device comprising:
   a communications interface configured to communicate with the plurality of network components in the NCS and with the control management circuitry in the NCS; and
   processing circuitry operatively connected to the communications interface and configured to:
      detect whether a discrepancy in configuration data received from a network component in the NCS exists based on a comparison of the configuration data with reference configuration data stored in a database;
      responsive to detecting the discrepancy, send a tamper detection signal to the control management circuitry indicating that the network component has been tampered with; and
      responsive to detecting that no discrepancy exists in the configuration data:
         monitor characteristics of data sent by the network component to the control management circuitry while the network component is in an operational mode;
         detect a discrepancy in the characteristics of the data sent by the network component based on a comparison to reference characteristics stored in the database; and
         responsive to detecting the discrepancy in the characteristics of the data sent by the network component, send the tamper detection signal to the control management circuitry indicating that the network component has been tampered with.

2. The configuration management device of claim 1 wherein one of the configuration data and the reference configuration data is software configuration data, and wherein the other of the configuration data and the reference configuration data is hardware configuration data.

3. The configuration management device of claim 2 wherein to detect a discrepancy in the configuration data received from the network component, the processing circuitry is configured to detect that the control management circuitry is using an incorrect software component to control the network component.

4. The configuration management device of claim 2 wherein to detect a discrepancy in the configuration data received from the network component, the processing circuitry is configured to detect that the control management circuitry is using incorrect configuration parameters to control the network component.

5. The configuration management device of claim 2 wherein to detect a discrepancy in the configuration data received from the network component, the processing circuitry is configured to detect that the control management circuitry is using an incorrect configuration for the network component to interpret signals received from the network component.

6. The configuration management device of claim 1 wherein the tamper detection signal causes the control management circuitry to either:
   suspend operation of the network component; or
   switch from communicating with the network component to communicating with a redundant network component.

7. The configuration management device of claim 1 wherein, based on the comparison of the configuration data with the reference configuration data, the processing circuitry is further configured to detect that no discrepancy exists in the configuration data received from a network component.

8. The configuration management device of claim 1 wherein the characteristics of the data sent by the network component comprise one or more of:
   a signal pattern;
   a rate at which the network component sends the data to the control management circuitry; and
   a type of signal that is sent from the network component to the control management circuitry.

9. The configuration management device of claim 1 wherein the network component comprises one of a sensor and an actuator.

10. A method of controlling a closed-loop, Networked Control System (NCS), wherein the NCS comprises a plurality of network components and control management circuitry that manages the plurality of network components, the method comprising:
   detecting whether a discrepancy in configuration data received from a network component in the NCS exists based on a comparison of the configuration data with reference configuration data stored in a database; and
   responsive to detecting the discrepancy, sending a tamper detection signal to the control management circuitry indicating that the network component has been tampered with; and
   responsive to detecting that no discrepancy exists in the configuration data:
      monitoring characteristics of data sent by the network component to the control management circuitry while the network component is in an operational mode;
      detecting a discrepancy in the characteristics of the data sent by the network component based on a comparison to reference characteristics stored in the database; and
      responsive to detecting the discrepancy in the characteristics of the data sent by the network component, sending the tamper detection signal to the control management circuitry indicating that the network component has been tampered with.

11. The method of claim 10 further comprising determining whether the network component is one of a recognized network component and an unrecognized network component.

12. The method of claim 11 further comprising comparing the configuration data with the reference configuration data responsive to determining that the network component is a recognized network component.

13. The method of claim 11 further comprising indicating that the network component has been tampered with to the control management circuitry responsive to determining that the network component is an unrecognized network component.

14. The method of claim 10 wherein one of the configuration data and the reference configuration data is software configuration data, and wherein the other of the configuration data and the reference configuration data is hardware configuration data.

15. The method of claim 10 wherein indicating that the network component has been tampered with to the control management circuitry comprises:
   generating a tamper detection message comprising:
      information identifying the network component; and
      an indicator that causes the control management circuitry to either:
         suspend operation of the network component; or
         switch from communicating with the network component to communicating with a redundant network component.

16. The method of claim 10 further comprising:
   sending a request message for the configuration data to one or more of the plurality of network components; and
   receiving a response message from the network component, wherein the response message comprises the configuration data of the network component.

17. The method of claim 16 further comprising:
   inspecting a header of the response message;
   determining a protocol used by the network component to send the response message; and
   processing the response message to obtain the configuration based on the determined protocol.

18. A non-transitory computer readable medium storing a computer program product configured to control a programmable computing device in a closed-loop, Networked Control System (NCS), the computer program product comprising software instructions that, when executed by processing circuitry of the programmable computing device, cause the processing circuitry to:
   detect whether a discrepancy in configuration data received from a network component in the NCS exists based on a comparison of the configuration data with reference configuration data stored in a database;
   responsive to detecting the discrepancy, send a tamper detection signal to control management circuitry in the NCS indicating that the network component has been tampered with; and
   responsive to detecting that no discrepancy exists in the configuration data:
      monitor characteristics of data sent by the network component to the control management circuitry while the network component is in an operational mode;
      detect a discrepancy in the characteristics of the data sent by the network component based on a comparison to reference characteristics stored in the database; and
      responsive to detecting the discrepancy in the characteristics of the data sent by the network component, send the tamper detection signal to the control management circuitry indicating that the network component has been tampered with.

19. The non-transitory computer readable medium of claim 18 wherein the characteristics of the data sent by the network component comprise one or more of:
   a signal pattern;

a rate at which the network component sends the data to the control manager management circuitry; and a type of signal that is sent from the network component to the control manager management circuitry.

20. The non-transitory computer readable medium of claim 18 wherein the network component comprises one of a sensor and an actuator.

* * * * *